(No Model.)
H. J. HARRIS.
SCREW CONNECTION IN METAL ROLLING MILLS.
No. 443,319. Patented Dec. 23, 1890.
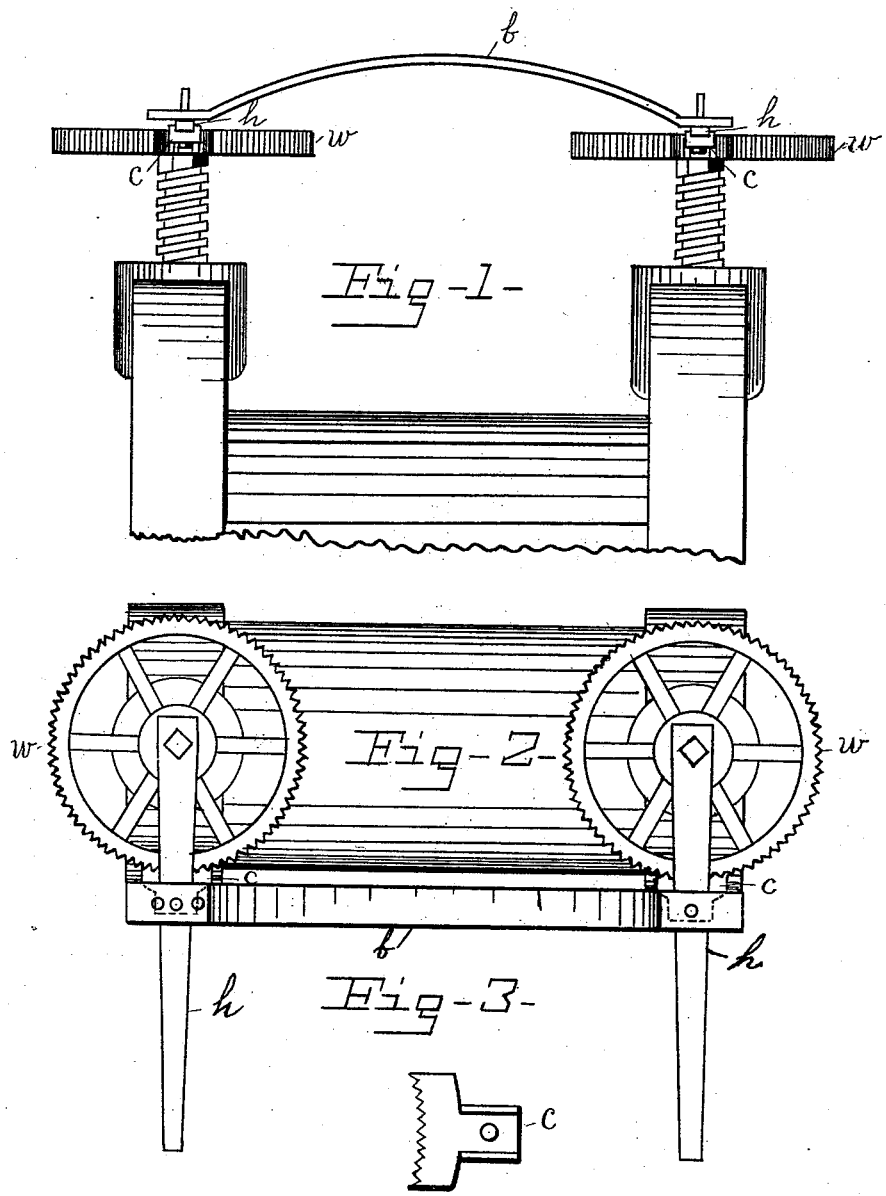

UNITED STATES PATENT OFFICE.

HENRY J. HARRIS, OF NILES, OHIO.

SCREW-CONNECTION IN METAL-ROLLING MILLS.

SPECIFICATION forming part of Letters Patent No. 443,319, dated December 23, 1890.

Application filed September 30, 1890. Serial No. 366,702. (No model.)

*To all whom it may concern:*

Be it known that I, HENRY J. HARRIS, a citizen of the United States, residing at Niles, in the county of Trumbull and State of Ohio, have invented certain new and useful Improvements in Screw-Connections in Metal-Rolling Mills; and I do hereby declare the following to be a full, clear, and exact description of my invention, such as will enable others skilled in the art to which it appertains to make and use the same, reference being had to the accompanying drawings, which form part of this specification.

My invention relates to that class of screw-connections in metal-rolling mills that are formed by cogged horizontal wheels shafted upon the heads of the screws in the opposite housings, having a straight connecting-bar between them to communicate motion; and its object is a mechanism whereby conveniently and instantly such exact adjustment of the upper roll may be effected as the thickness of the material to be rolled and the proper passages of the same through the rolls may require, thus economizing labor and securing a better product in the operation of rolling any metal, especially in sheet and plate mills. I accomplish this object by substituting for the wheels now used two similar outward cogged or toothed wheels provided with clutch-lever handles to move them, and for the straight connecting-bar an arched one that will permit a complete revolution of the wheels, each of which parts constituting my invention will be hereinafter more fully described.

In the drawings, Figure 1 is a side elevation view of an upper section of a sheet-roll and housings with my invention in place. Fig. 2 is a top view of the same, and Fig. 3 is a top view of the clutch $c$, that is attached to the lever-handle.

Parts are indicated by letters, and similar letters refer to similar parts in each view.

As the equipment of each screw is the same, that of one only, with the connecting-bar, will be described.

The wheel $w$, as stated, is an outward cogged or toothed wheel, of suitable dimensions, shafted horizontally upon the head of the screw $s$. A wheel with cogs or teeth on its side near the rim would be an equivalent of the wheel $w$; also, if preferred for any reason, a fraction of the wheel $w$, representing a sector of any size, may be used instead, and such device would be a mechanical equivalent thereof.

The lever-handle $h$ is a bar loosely pivoted on the screw-head above the wheel $w$ and, in contact therewith, extends beyond its periphery far enough for the purpose of a handle. Immediately outside of the wheel $w$ the handle $h$ is clasped in a groove upon the upper side of the clutch $c$, the same being held in place by the vertical pin $p$, which is headed underneath and made rigid by screw-connection in the handle $h$, and which pin also supplies pivot for the connecting-bar $b$.

The connecting-bar $b$, the purpose of which is to communicate motion between the wheels $w$ $w$, is, by means of the pins $p$ $p$, pivotally attached to the lever-handles $h$ $h$. At one end of the bar $b$ several apertures therethrough appear, so that, as the distance between the pivots of the connecting-bar $b$ must be the same as the distance between the centers of the wheels $w$ $w$, by shifting the pivot-pin the distance between the housings in different stages in the life of the rolls may be accommodated; but this feature of the bar $b$ is not new. The upward arch of the connecting-bar $b$ is made in order that it may escape the screw-head in the revolution of the wheels $w$ $w$. Any curvature or angle that permits such escape would be the mechanical equivalent of the arch shown in the drawings.

The operation of my invention will now be readily comprehended and its value understood. The operator, wishing to make an adjustment, seizes either handle $h$ and turns the screws simultaneously and equally, disengaging the clutch $c$ from the wheel $w$ by lifting the handle upward, and thus also being able to move either wheel in either direction separately and at pleasure.

What I claim as my invention, and desire to secure by Letters Patent, is—

1. In screw-connections in metal-rolling mills, the outwardly cogged or toothed wheel $w$, or its equivalents, shafted horizontally upon the screw-head and provided with the lever-handle $h$, loosely pivoted on the screw-head above the wheel $w$, extending beyond its periphery, and carrying upon its under side the clutch $c$, substantially as described, and for the purpose expressed.

2. In screw-connections in metal-rolling mills, the arched connecting-bar $b$, at each end pivotally attached to the lever-handles $h\ h$, substantially as described, and for the purpose expressed.

3. In screw-connections in metal-rolling mills employing two opposite vertical screws, in combination, the outwardly cogged or toothed wheels $w\ w$, horizontally shafted upon the respective screw-heads and provided with the lever-handles $h\ h$, carrying the clutches $c\ c$, and the arched connecting-bar $b$, at each end pivotally attached to the lever-handles $h\ h$, substantially as described, and for the purpose expressed.

In testimony whereof I affix my signature in the presence of two witnesses.

HENRY J. HARRIS.

Witnesses:
JOHN R. DAVIS,
HORACE SMITH.